Feb. 19, 1952  S. LINDEN  2,586,237
CONVERTIBLE BASSINET AND CHILD'S SEAT
Filed Feb. 4, 1950
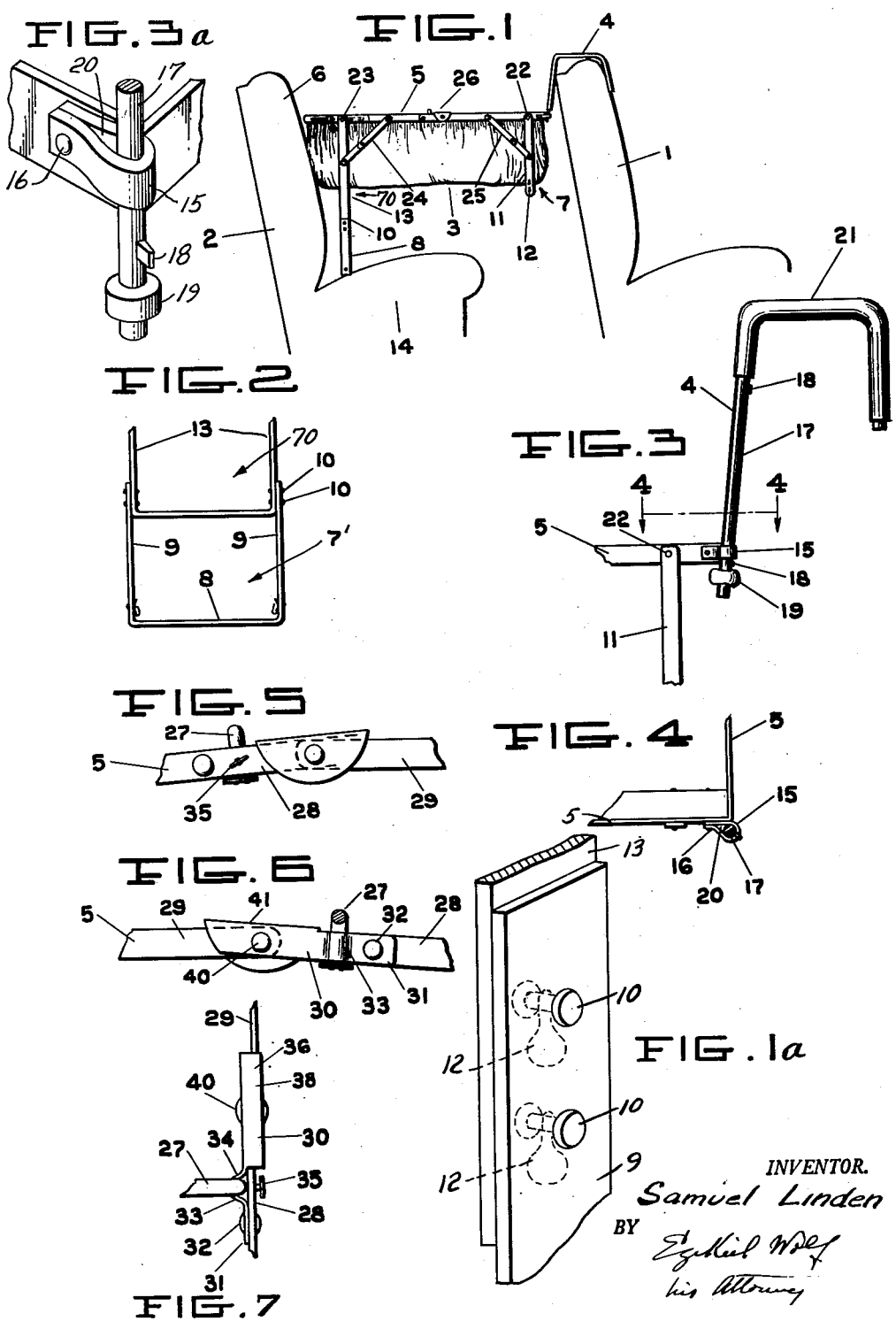
INVENTOR.
Samuel Linden
BY
Ezekiel Wolf
his Attorney

Patented Feb. 19, 1952

2,586,237

UNITED STATES PATENT OFFICE 2,586,237

CONVERTIBLE BASSINET AND CHILD'S SEAT

Samuel Linden, Chelsea, Mass., assignor to Bunny Bear, Inc., Everett, Mass., a corporation of Massachusetts Application February 4, 1950, Serial No. 142,381

9 Claims. (Cl. 5—94)

The present invention relates to improvements in convertible bassinets and children's seats and more particularly to the device of the type indicated in the Mover patent, No. 2,488,225.

Such convertible bassinets are intended to be used for automobile travel and must also be so constructed that they can be taken out of the automobile and used out of doors and in the home both as a bassinet or a seat.

The present invention relates more particularly to improvements whereby the convertible combination may be adjustable for various car arrangements and has in addition certain further improvements as will appear from the description in the specification set forth below when taken in connection with the drawings illustrating an embodiment of the invention in which:

Figure 1 shows the invention used as a bassinet between the front and rear seats of an automobile.

Figure 1a shows an enlarged detail of a portion of the leg support shown in Figure 1.

Figure 2 shows a detail for the leg bracket adjustments.

Figure 3 shows a detail for supporting the bassinet.

Figure 3a shows a detail of the adjustable hook-shaped support of Figure 3.

Figure 4 shows a section taken on the line 4—4 of Figure 3.

Figures 5 and 6 show a detail of the hinge construction, Figure 5 being an outside view and Figure 6 and inside view of the same detail, and Figure 7 is a plan view looking down upon the detail as viewed in Figure 5.

In the arrangement indicated in the drawings, I and 2 are conventional seats of an automobile with back rests and seat portions. The bassinet 3 at one end has a hook-shaped support 4 which passes over the top of the front seat and bears down on the front of the back rest lying against the upholstery of the back rest. This is more clearly shown in Figure 3 and will be described more in detail later.

The bassinet is suspended between the back rest of the front seat and the back rest of the back seat usually by wedging the top rectangular frame section 5 of the bassinet from which the hammock is supported lengthwise between the upper section 6 of the back rest on the back seat and the back rest of the front seat. In most cars of the present type, the front seat is movable to some extent longitudinally of the car and for this reason the space between the two back rests I and 2, as indicated in Figure 1, may be varied in which case it is not always possible to wedge the bassinet in place when the front seat is in the desired adjusted position for accommodation of the driver.

In the present invention, stability for the support of the bassinet is obtained by a separable removable leg section which may be taken from one end and added to the leg bracket at the other end of the bassinet. This is illustrated in Figures 1 and 2. The U-shaped supporting bracket 7, forming, what might be called for reference purposes, the head end of the bassinet, is made of separable sections, the lower section 7' comprising an open formed U-shaped member with a cross base 8 and upwardly arms 9, 9, which latch in place by means of eyelets 12, 12 and interlocking keys 10, 10, the former in the side sections 11 and the latter in the separable side sections 9, 9, extending upwards from the cross base element 8 of the lower separable section 7'. Normally this forms one end support for the bassinet on a level surface.

When the separable section 7' is removed from the front end of the bassinet and attached to the other end 70, as indicated in Figure 2, the side section elements 9, 9, which carry the keys 10, 10, formed as studs, riveted in the side arms 9, 9, as shown in Figure 1a, interlock with the eyelets 12, 12, formed in the sides 13, 13, of the rear end U-shaped support 70. It is to be noted that front and rear, referred to the bassinet has no significance as regards the position of the infant in the bassinet as it is merely a matter of convenience in description in this specification. When the bassinet is supported between the span of the two back rests and the rear bracket does not reach the seat, the U-shaped end of the front bracket is removed and attached to the side supports 13 of the rear U-shaped support 70 making the back legs considerably longer as shown in Figure 1 so that the back section of the bassinet may be supported from the seat section 14 of the back seat. Since the front supporting hook 4 is adjustable, as will shortly be seen, there is never any question but that the bassinet in the rear end will rest firmly on the seat 14.

The method of the support at the forward end is shown more clearly in Figures 1, 3 and 4. The frame 5 at the top of the bassinet extends around the front end in a continuous band or frame as indicated in Figure 4. At the corner of the frame, a loop 15 is formed with a strip of material and the two ends of the loop are riveted together and to the frame by the rivet 16. The rivet may be free enough to act as a pivot so that the loop itself does not need to remain in a rigid position with respect to the frame but may rotate with respect to the normally horizontal axes through the rivet. The loop 15, as will be more clearly seen in Figure 4, is formed with a part of the section rounded but the back portion near the rivet straight providing sufficient clearance for the shank 17 and the projecting ears 18 of the hook element 4. The small ears 18, 18 projecting outward from the rod, as indicated in Figure 14, will catch beneath the loop when the rod is turned so that the hook hangs over the back rest and thereby prevents the loop and frame from dropping down to the rubber ring 19 which of course also serves to prevent the rod 17 from coming through the loop when the unit is otherwise handled. The rod 17 may be adjusted to the desired position for hanging the bassinet on the front back rest at the desired height by turning the rod until the ears 18 will slide through the space 20 in the loop at the rear ends of the loop and moving the rod until the selected length is obtained. Only two ears are shown on the rod 17 but a number can be used provided they are spaced further apart than the width of the band of the loop. The rod is then turned around 180°, whereupon the ears will catch beneath the loop and then the hook may be hung on the back rest in its desired position. The top of the rod 4 is bent around in an invertible U-shaped fashion and is protected by a rubber cover 21 which also furnishes additional gripping means to keep the hook in place.

The front and back U-shaped braces 7 and 13 are pivoted to the frame at 22 and 23 respectively and are foldable or extensible in the plane of the frame or perpendicular thereto by means of the pivoted link pairs 24 and 25 attached between the frame 5 and the supporting brackets 7 and 13. For the purpose of converting the bassinet into the seat, the frame 5 is hinged in its center section at 26. The arrangement for hinging in the present invention is a distinct improvement over that previously used, inasmuch as the hinge provides a holding means for the stretcher bar 27 which is necessary when the bassinet is converted into a seat. The frame 5, as shown in Figures 5, 6 and 7, terminates at the hinge in ends 28 and 29. To one set of ends 28 there is riveted a formed piece 30 which comprises a section 31 riveted face-to-face with the end 28 by means of the rivet 32. This form piece just behind the rivet 32 is arched inward of the frame at 33 to receive the stretcher bar 27 which is provided with an elbowed end 34 which may be inserted within the arched opening of the section 33 and the section 28 of the end of the half frame. A set screw 35 threaded through the section 28 holds the stretcher bar in position.

The form piece 30 beyond the arched section 33 is formed with an inverted U-shaped channel section 36 with the open end downward. This U-shaped section or channel has one face, the inner face, lying against the end 28 and the other face or side 38 of the U spaced away from it so that the opposite end section 29 of the frame 5 may be received within the channel 36. A single pivoting rivet 40 rivets the end 29 into the channel 36, thereby pivoting the end 29 permitting it to turn only in a downward direction as viewed in Figure 6. The top wall 41 of the channel 36 is spaced to provide sufficient clearance so that the end 29 beyond the pivot will clear the top wall 41. The stretcher bar 27 is held in the same way at both sides of the frame and in fact, both sides of the frame, as far as the hinge is concerned, are constructed in the same way.

The bassinet is finished off in the same way as noted in the prior patent mentioned above with fabric or any other suitable material being used for the hammock and the supporting means for it. The operation and use of the bassinet and child's seat readily follows from the description given above. It is equally serviceable in an automobile or on the ground or as a portable device since it can be completely folded up into a flat rectangular package and may be stored away conveniently either in a trunk of an automobile or within the machine itself.

Having now described my invention, I claim:

1. A convertible bassinet and child's chair comprising a frame section having a hammock supported therefrom, a pair of U-shaped brackets connected to said frame serving for front and rear supports therefor for supporting said bassinet in a level position, one of said brackets having a section separable from the rest of the bracket and means for attaching said separable section to the other bracket for extending the length thereof.

2. A convertible bassinet and child's chair having a pair of U-shaped brackets serving as supporting legs therefor across from one side to the other side thereof, the U-shaped bracket forming one set of legs having an end separable from the side prongs of the U and means for attaching said separable end to the end of said other U-shaped bracket.

3. A convertible bassinet and child's chair having a pair of U-shaped brackets serving as supporting legs therefor across from one side to the other side thereof at each end of the bassinet, an adjustable hook element attached at one end of the bassinet for suspending the same over the back rest of an automobile seat, and means in fixed relation with the U-shaped bracket at the other end of the bassinet for lengthening said bracket to a length whereby said U-shaped support at said end is extended to the rear seat of the automobile.

4. A convertible bassinet and child's chair having a pair of U-shaped brackets serving as supporting legs therefor across from one side to the other side thereof at each end of the bassinet, an adjustable hook element attached at one end of the bassinet for suspending the same over the back rest of an automobile seat, the bracket adjacent the hook end having a U-shaped end separable from the side prongs of the U and means for attaching said separable end to the end of said other U-shaped bracket.

5. A convertible bassinet and child's chair comprising a frame section having a hammock supported therefrom, a hook member for supporting one end of the bassinet, said hook member being shaped to fit over the back rest of an automobile seat, means for attaching the hook member to said frame comprising a loop element having a pivoting rivet attached at one end to the side of the frame, said loop element being rounded in the portion away from the place of attachment and shaped to receive the shank of said hook, said shank having outwardly projecting ears on the same side of the shank as said hook, said ears being of such a size as to pass within said loop when said ears are turned in the direction of the attaching end of the loop to the frame whereby said hook may be positioned at the desired distance from said frame for properly supporting the same in an automobile.

6. A convertible bassinet and child's chair comprising a frame section having a hammock supported therefrom, a hook member for supporting one end of the bassinet, said hook member being shaped to fit over the back rest of an automobile seat, means for attaching the hook member to said frame comprising a loop element having a pivoting rivet attached at one end to the side of the frame, said loop element being rounded in the portion away from the place of attachment and shaped to receive the shank of said hook, said shank having outwardly projecting ears on the same side of the shank as said hook, said ears being of such a size as to pass within said loop when said ears are turned in the direction of the attaching end of the loop to the frame whereby said hook may be positioned at the desired distance from said frame for properly supporting the same in an automobile and a ring member at the base of the shank of said hook for preventing the shank from coming out of said loop.

7. A convertible bassinet and child's chair comprising a top supporting frame having a hammock suspended therefrom, a pair of U-shaped leg brackets at each end of the hammock extending from one side to the other comprising front and rear supporting brackets, a hook member attached to the front end of the frame for supporting the same over the back rest of an automobile seat, the U-shaped bracket at the front end of the frame having a separable section at its end and means for attaching said separable section to the lower end of the bracket at the other end of the frame for lengthening said rear supporting bracket, said hook element having projecting ears on the shank of the hook, the supporting means for the hook comprising a loop attached to the frame in which the shank of the hook is adjustable, said projecting ears being positioned so that the shank may be moved up and down in the loop and be turned at the desired position for engagement of the loop with one of said ears when the hook is positioned at the desired heighth from the frame for suspending the front end of the frame away from the back rest of the front seat of an automobile.

8. In a convertible bassinet and child's chair, a sectional frame including two U-shaped members hinged at their open ends and turned towards one another in a common horizontal plane, said hinges comprising channeled elements with openings downward, the inner side wall of the channels having extensions with inwardly projecting rounded grooved sections terminating in straight sections in face-to-face contact with the ends of one of the U's at its end, the end of said U-shaped members being riveted to said ends and to said inside channel wall providing openings in said rounded grooved sections to receive a transverse stretcher bar, said transverse stretcher bar and means for holding the stretcher bar in position in said opening, the other end of said other U-shaped member being positioned in the channel section and riveted to the same by the riveting means attaching the first mentioned end of the U-shaped member to said channel walls, said riveting means pivoting the ends of the U-shaped members so that they may be opened only downwards.

9. In a convertible bassinet and child's chair, a sectional frame including two U-shaped members hinged at their open end and turned towards one another in a common horizontal plane, said hinging elements each comprising a channel forming element having a pivoting rivet passing therethrough hinging only one of said U-shaped members, each said channel member having an inwardly extending side with an internally rounded section and a straight section extending parallel and in face contact with the unhinged end of the other U-shaped member, means riveting said extensions and U-shaped members together thereby forming a rigid attachment between the channel member and said latter U-shaped frame member, a stretcher bar having ends turned in at an angle to engage between the internally rounded section and the end of the U-shaped frame and means for holding the end of the stretcher bar locked in said position.

SAMUEL LINDEN.

REFERENCES CITED

The following references are of record in the file of this patent:

UNITED STATES PATENTS

| Number | Name | Date |
| --- | --- | --- |
| 2,300,425 | Kiesow | Nov. 3, 1942 |
| 2,488,225 | Mover | Nov. 15, 1949 |
| 2,503,602 | Titley | Apr. 11, 1950 |
| 2,508,688 | Rossi | May 23, 1950 |

FOREIGN PATENTS

| Number | Country | Date |
| --- | --- | --- |
| 623,613 | Great Britain | May 19, 1949 |